(12) United States Patent
Kruts et al.

(10) Patent No.: US 11,014,679 B2
(45) Date of Patent: May 25, 2021

(54) SILL HEIGHT MORPHING EVACUATION SLIDE

(71) Applicant: GOODRICH CORPORATION, Charlotte, NC (US)

(72) Inventors: Ivan Kruts, Sacramento, CA (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 428 days.

(21) Appl. No.: 15/872,430

(22) Filed: Jan. 16, 2018

(65) Prior Publication Data

US 2019/0217962 A1    Jul. 18, 2019

(51) Int. Cl.
*B64D 25/14* (2006.01)
*A62B 1/20* (2006.01)

(52) U.S. Cl.
CPC .............. *B64D 25/14* (2013.01); *A62B 1/20* (2013.01)

(58) Field of Classification Search
CPC .................................. B64D 25/14; A62B 1/20
See application file for complete search history.

(56) References Cited

U.S. PATENT DOCUMENTS

| | | | | |
|---|---|---|---|---|
| 3,679,025 A * | 7/1972 | Rummel | ................ | B64D 25/14 182/20 |
| 3,829,353 A * | 8/1974 | Fisher | ....................... | A62B 1/20 428/12 |
| 3,833,088 A * | 9/1974 | Chacko | .................. | B64D 25/14 182/48 |
| 4,018,321 A * | 4/1977 | Fisher | ....................... | A62B 1/20 193/25 B |
| 5,875,868 A | 3/1999 | Smialowicz et al. | | |
| 5,975,467 A * | 11/1999 | O'Donnell | ............. | B64D 25/14 182/48 |
| 6,536,715 B1 * | 3/2003 | Moran | .................... | B64D 25/14 244/137.2 |
| 8,215,586 B2 * | 7/2012 | O'Donnell | ............. | B64D 25/14 244/137.2 |
| 9,701,411 B2 * | 7/2017 | Kohlmeier-Beckmann | ................ | B64D 25/14 |
| 9,809,316 B2 | 11/2017 | Hartman et al. | | |
| 2017/0088273 A1 | 3/2017 | Prevost et al. | | |

\* cited by examiner

*Primary Examiner* — Brian M O'Hara
(74) *Attorney, Agent, or Firm* — Snell & Wilmer L.L.P.

(57) ABSTRACT

A sill height morphing feature may comprise an upper chamber comprising an orthogonal foot section and a first foot tube, a lower chamber, relatively below the upper chamber, coupled to the upper chamber and comprising a second foot tube, a sliding surface between the upper chamber and the lower chamber, wherein the first foot tube lies relatively beneath the sliding surface, wherein the second foot tube lies relatively beneath the sliding surface and relatively behind and proximate to the first foot tube, wherein the sliding surface is coupled to the first foot tube at a top surface of the first foot tube.

15 Claims, 5 Drawing Sheets

SILL HEIGHT MORPHING EVACUATION SLIDE

FIELD

The present disclosure relates to inflatable evacuation slides and, in particular, to inflatable evacuation slides having morphing characteristics.

BACKGROUND

Emergency evacuation slides may be used to exit an aircraft absent a jet way or other suitable means of egress for passengers. The slides may deploy from a door sill or a side of the aircraft fuselage, for example. High door sills tend to increase the velocity of egressing passengers tending to cause injury to the passengers.

SUMMARY

In various embodiments, a sill height morphing feature is provided. A sill height morphing feature may comprise an upper chamber comprising a foot section and a first foot tube, wherein the foot section comprises an axis of orthogonality, relative to an axis of the upper chamber, intersecting the first foot tube, a lower chamber, relatively below the upper chamber, coupled to the upper chamber and comprising a second foot tube, and a sliding surface between the upper chamber and the lower chamber, wherein the first foot tube lies relatively beneath the sliding surface, wherein the second foot tube lies relatively beneath the sliding surface and relatively behind and proximate to the first foot tube, wherein the sliding surface is coupled to the first foot tube at a top surface of the first foot tube.

In various embodiments, a portion of the lower chamber comprising the second foot tube is configured to swing free from the upper chamber and the sliding surface. In various embodiments, the foot section, the sliding surface, and the portion of the lower chamber comprising the second foot tube are configured to deform in response to a force and a change in a sill height. In various embodiments, the portion of the lower chamber comprising the second foot tube and the foot section define an angle $\theta$ respectively between each other in response to the force. In various embodiments, the second foot tube contacts an exit surface in response to the force. In various embodiments, an interference between the exit surface and the second foot tube tends to inhibit deformation of the foot section, the sliding surface, and the portion of the lower chamber comprising the second foot tube. In various embodiments, the sliding surface defines an angle $\alpha$ between the exit surface and the sliding surface and wherein, in response to the deformation of the foot section the sliding surface turns to define an angle $\beta$ between the exit surface and the sliding surface. In various embodiments, the angle $\alpha$ defines a velocity vector comprising a first component and a second component wherein the first component is greater than the second component. In various embodiments, in response to the sliding surface turning to define the angle $\beta$, the velocity vector is turned such that the first component is less than the second component.

In various embodiments, an evacuation system for an aircraft structure is provided. An evacuation system for an aircraft structure may comprise an evacuation slide coupled to the aircraft structure. The evacuation slide may comprise a head end coupled at a door sill of the aircraft structure, a foot end opposite the head end, a dual chambered side tube extending longitudinally from the head end to the foot end and having an upper chamber and a lower chamber, wherein the lower chamber is coupled to the upper chamber longitudinally and relatively below the upper chamber, a sliding surface between the upper chamber and the lower chamber and extending from the head end to the foot end, the foot end having a sill height morphing feature comprising, a foot section having a first foot tube coupled to the upper chamber, wherein the foot section comprises an axis of orthogonality, relative to an axis of the upper chamber, intersecting the first foot tube, a portion of the lower chamber, configured to swing free from the upper chamber and the sliding surface, comprising a second foot tube, wherein the first foot tube lies relatively beneath the sliding surface, wherein the second foot tube lies relatively beneath the sliding surface and relatively behind and proximate to the first foot tube, wherein the sliding surface is coupled to the first foot tube at a top surface of the first foot tube.

In various embodiments, the foot section, the sliding surface, and the portion of the lower chamber comprising the second foot tube are configured to deform in response to a force. In various embodiments, the portion of the lower chamber comprising the second foot tube and the foot section define an angle $\theta$ respectively between each other in response to the force. In various embodiments, the second foot tube contacts an exit surface in response to the force. In various embodiments, an interference between the exit surface and the second foot tube tends to inhibit deformation of the foot section, the sliding surface, and the portion of the lower chamber comprising the second foot tube. In various embodiments, the sliding surface defines an angle $\alpha$ between the exit surface and the sliding surface and wherein, in response to the deformation of the foot section the sliding surface turns to define an angle $\beta$ between the exit surface and the sliding surface. In various embodiments, the angle $\alpha$ defines a velocity vector comprising a first component and a second component wherein the first component is greater than the second component. In various embodiments, in response to the sliding surface turning to define the angle $\beta$, the velocity vector is turned such that the first component is less than the second component.

In various embodiments, a method of morphing a sill height morphing evacuation slide is provided. The method may comprise deploying, from a door sill, an evacuation slide comprising a foot end having sill height morphing feature comprising a foot section and a portion of a lower chamber, and contacting a first foot tube of the foot section with an exit surface, wherein the portion of the lower chamber comprises a second foot tube, wherein an angle between the evacuation slide and the exit surface is such that the portion of the lower chamber comprising the second foot tube may swing free of an upper chamber in response to a force. In various embodiments, the method may further comprise applying a force to the foot section and, in response to the applying the force, contacting the second foot tube with the exit surface and turning an angle between a sliding surface and the exit surface from a first angle to a second angle. The method may further comprise turning a velocity vector in response to turning the angle between the sliding surface and the exit surface from the first angle to the second angle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials. With reference to an aircraft evacuation slide, "proximal" refers to a head end, and "distal" refers to a foot end.

Slides according to the present disclosure may extend from an aircraft structure, such as a fuselage or a wing, for example, to an exit surface. A sill height morphing feature is provided to, among other things, redirect the velocity vector of a passenger exiting the foot end of the slide. The slide may comprise a single lane slide comprising dual chambered (upper chamber and lower chamber) side tubes with a sliding surface defined between the side tubes or a dual lane slide comprising dual chambered side tubes and a center tube extending parallel to and between the dual chambered sited tubes thereby defining a first lane and a second lane between the side tubes and the center tube. A portion of a lower chamber side tube at a foot end of the slide may be decoupled from the upper chamber side tube and, in that regard, may tend to enable the shape of the slide to change (i.e. morph) in response to a change in sill height or the forces induced by an egressing passenger. In various embodiments, one or more truss pillows may be coupled to a lower chamber side tube or a center tube. Straps may couple the truss pillows to the center tube. In various embodiments, the truss pillow and strap arrangement may form a truss structure with the slide for load distribution. In this regard, the truss pillows and straps may increase structural integrity (i.e., beam strength or stiffness of the slide) while tending to minimize weight and pack volume of the slide.

Figure 1A:
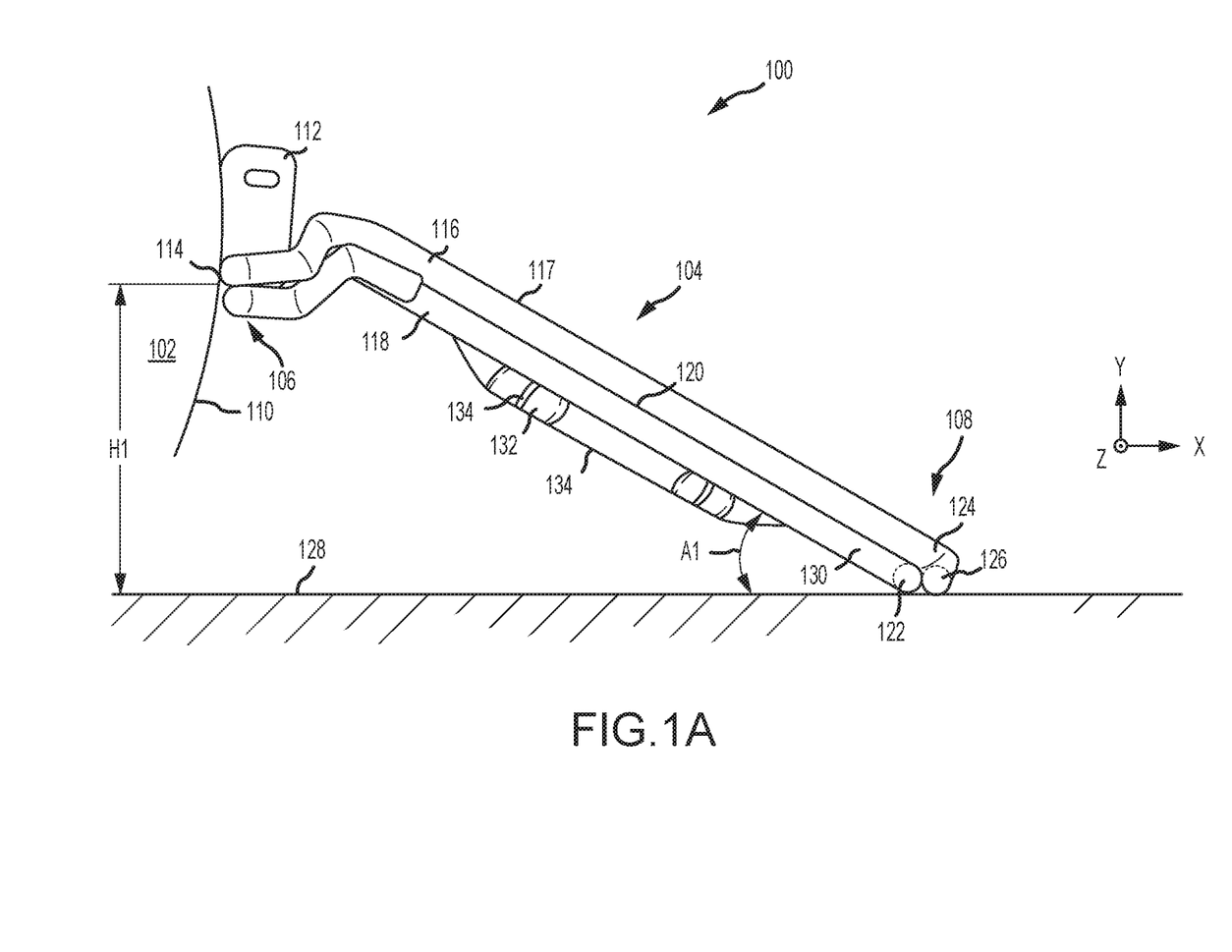
FIG. 1A illustrates a side view of a sill height morphing evacuation slide in a deployed position, in accordance with various embodiments.
Figure 1B:
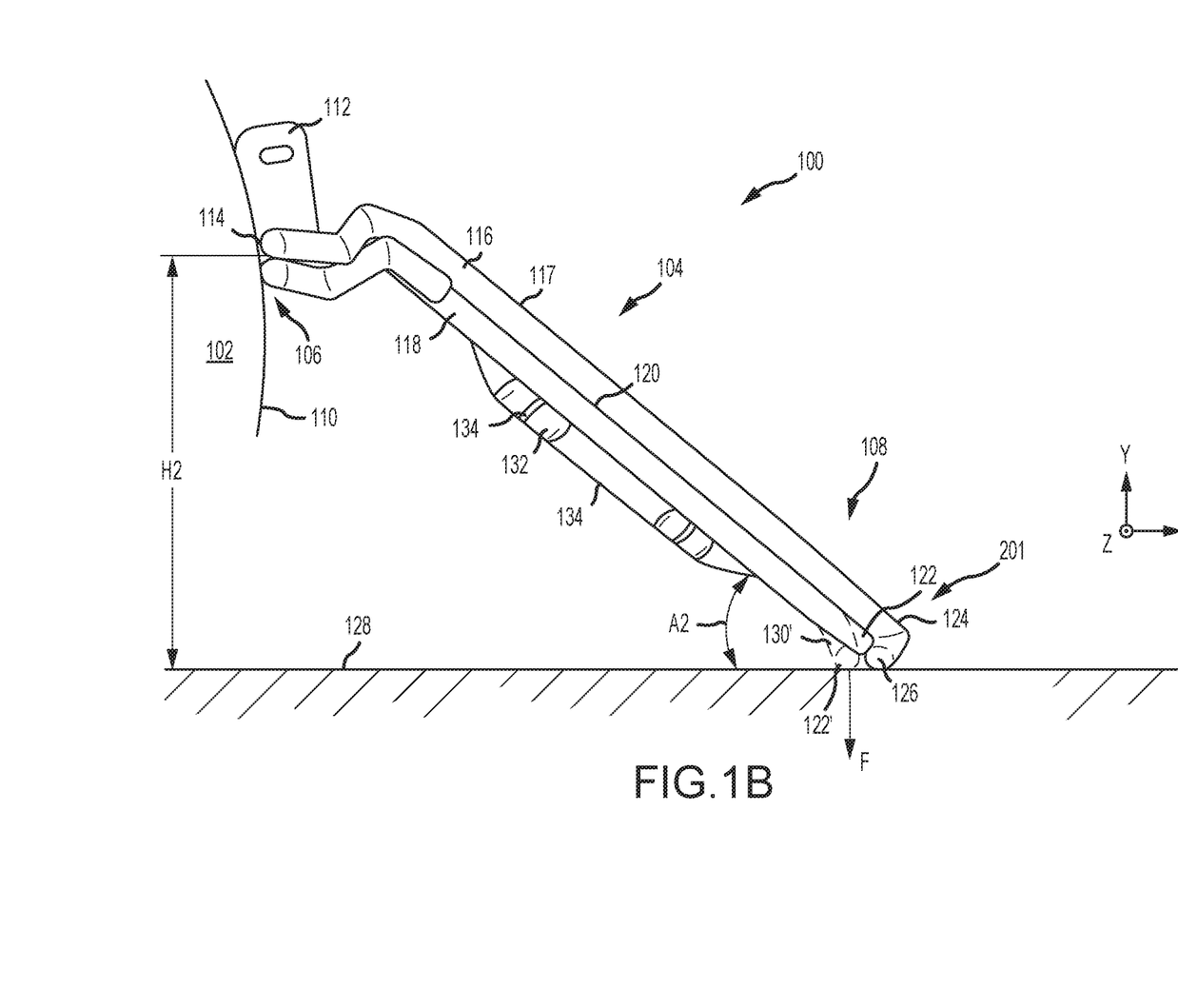
FIG. 1B illustrates a side view of a sill height morphing evacuation slide in a deployed position, in accordance with various embodiments.

With reference to FIGS. 1A and 1B, an evacuation system 100 is illustrated, in accordance with various embodiments. Evacuation system 100 may comprise evacuation slide 104 coupled to an aircraft structure 102. Evacuation slide 104 may comprise a head end (or proximal end) 106 and a foot end (or distal end) 108. Head end 106 may be coupled to aircraft structure 102. In various embodiments, aircraft structure 102 may comprise a fuselage 110 having an emergency exit door 112, a fairing, a wing, or any other portion of an aircraft. In various embodiments, evacuation slide 104 may deploy from door sill 114 and, in response to deployment, an inflation source may deliver a pressurized gas to at least partially fill evacuation slide 104 with the pressurized gas. In a deployed state, evacuation slide 104 may operate as a slide to permit egress of passengers from aircraft structure 102. In various embodiments, evacuation slide 104 may be deployed in response to opening emergency exit door 112.

FIG. 1A and FIG. 1B illustrate evacuation slide 104 in a deployed position with XYZ-axes provided for reference. Evacuation slide 104 may extend from an exit location at an emergency exit door 112 and slope generally radially outward, in the positive X-direction, and downward, in the negative Y-direction, and toward an exit surface 128. The exit surface 128 may be ground, water, a runway, uneven terrain or other surface, for example. The head end 106 of evacuation slide 104 may be secured to aircraft structure 102, such as by a girt at door sill 114. The foot end 108 of evacuation slide 104 may reach exit surface 128. Evacuation slide 104 comprises dual chambered side tubes 117 having an upper chamber 116 and a lower chamber 118. In various embodiments, truss pillows 132 may be coupled to lower chamber 118 and straps 134 may be coupled across at least one of truss pillows 132, side tubes 117, or a center tube disposed longitudinally between side tubes 117. In various embodiment, straps 134 may be coupled laterally (along the Z-axis) across evacuation slide 104 and/or longitudinally with respect to the side tubes 117.

In various embodiments, upper chamber 116 may comprise a longitudinal tube extending from head end 106 of evacuation slide 104 toward foot end 108 and may comprise a substantially orthogonal foot section 124 at foot end 108. In various embodiments, lower chamber 118 may comprise a longitudinal tube extending from head end 106 of evacuation slide 104 to foot end 108 and may comprise a second foot tube 122 (extending along the Z-axis) across the lower chambers of the side tubes 117. In various embodiments, upper chamber 116 and lower chamber 118 are coupled longitudinally with the upper chamber 116 relatively above the lower chamber 118. In various embodiments, evacuation slide 104 comprises a sliding surface 120 sandwiched between upper chamber 116 and lower chamber 118 and defined between the side tubes 117. Foot section 124 may comprise an first foot tube 126 (extending generally along the Z-axis) across the upper chambers of side tubes 117, disposed relatively below the sliding surface 120 and coupled to sliding surface 120 at a top surface 206 of first foot tube 126. As used herein, the substantial orthogonality of foot section 124 is relative to an axis of the upper chamber 116 and a comprises an orthogonal portion having an axis of orthogonality extending generally in the Y-X plane intersecting the first foot tube 126. In this regard, first foot tube 126 and second foot tube 122 may lie relatively in plane with each other and relatively beneath sliding surface 120 with second foot tube 126 relatively behind first foot tube 126.

In various embodiments, foot end 108 of evacuation slide 104 may comprise a sill height morphing feature 201 formed by configuring a portion 130 of lower chamber 118 to swing free from upper chamber 116 and sliding surface 120 (e.g. decoupling portion 130 from upper chamber 116 and sliding surface 120). A vertical distance between door sill 114 and exit surface 128 is shown in FIG. 1A as a sill height H1. An angle between evacuation slide 104 and exit surface 128 is shown as deployment angle A1. In response to evacuation slide 104 being deployed at or below deployment angle A1, second foot tube 122 and first foot tube 126 contact exit surface 128. An interference between exit surface 128 and second foot tube 122 tends to hold portion 130 of lower chamber 118 proximate foot section 124. A vertical distance between door sill 114 and exit surface 128 is shown in FIG. 1B as a sill height H2 greater than H1. An angle between evacuation slide 104 and exit surface 128 is shown as deployment angle A2 greater than A1. In response to evacuation slide 104 being deployed at or above deployment angle A2, first foot tube 126 contacts exit surface 128 and second foot tube 122 remains above exit surface 128 proximate second foot tube 126. An internal pressure force of lower chamber 118 tends to hold portion 130 proximate foot section 124. In response to a downward (in the negative y-direction) force F, such as may be generated by a passenger sliding along sliding surface 120 and which may be resolved to a force vector in the negative y-direction, foot section 124 and may deform (i.e., morph) and portion 130 may deform relatively downward (in the negative y-direction) toward position 130' and second foot tube may contact sliding surface 128 at position 122'.

Figure 2A:
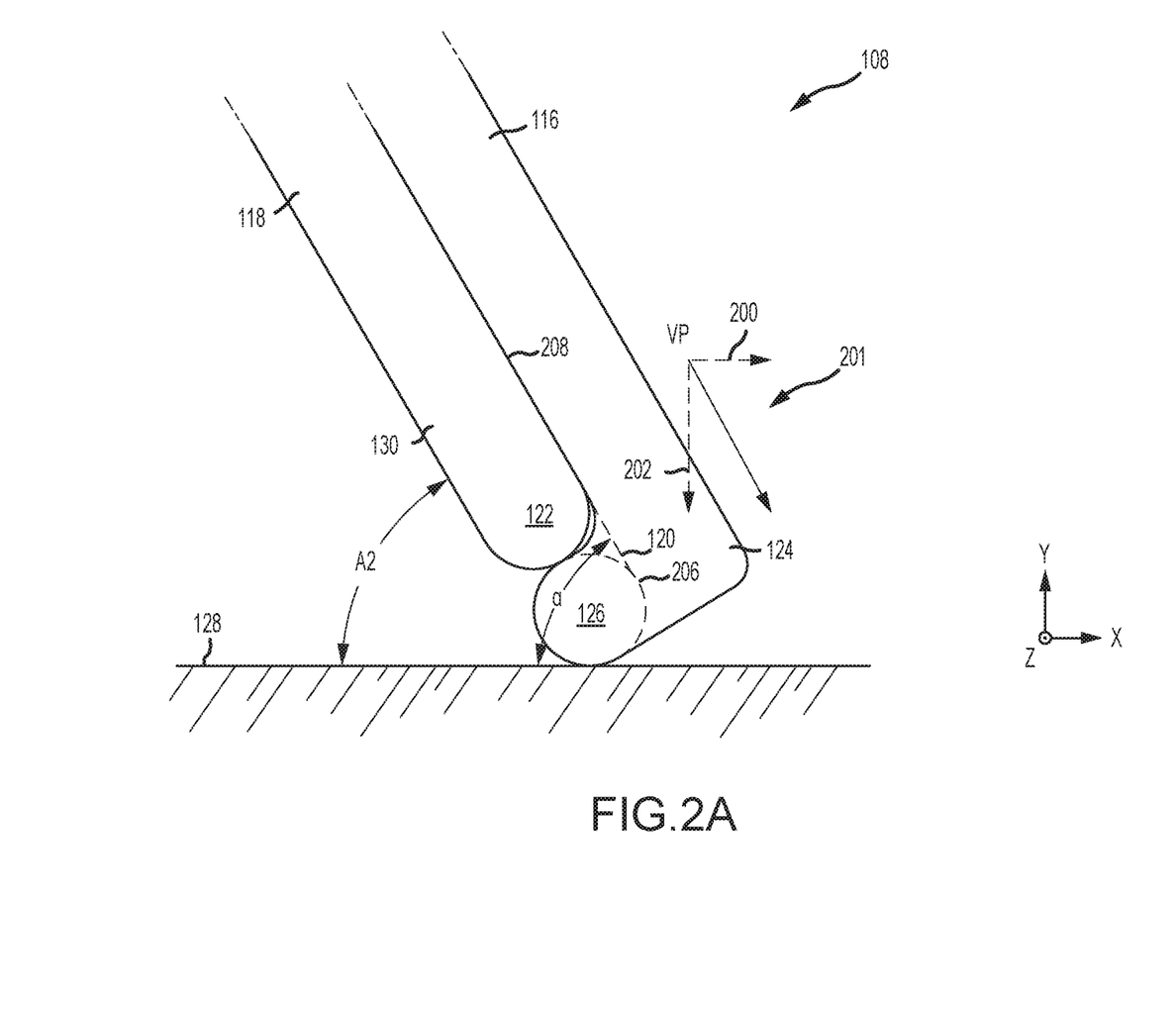
FIG. 2A illustrates a foot end of a sill height morphing evacuation slide, in accordance with various embodiments.

In various embodiments and with additional reference to FIG. 2A, foot end 108 comprising sill height morphing feature 201 is illustrated in detail as deployed at angle A2. The velocity vector $V_P$ of a passenger sliding on sliding surface 120 from head end 106 toward foot end 108 comprises a Y-component 202 and an X-component 200. In response to a passenger sliding proximate head end 106 toward foot end 108, $V_P$ is defined by an initial angle α between exit surface 128 and the sliding surface 120 and Y-component 202 has a greater magnitude than X-component 200. In various embodiments and in response to a passenger sliding proximate portion 130 toward foot end 108, downward force F is generated.

Figure 2B:
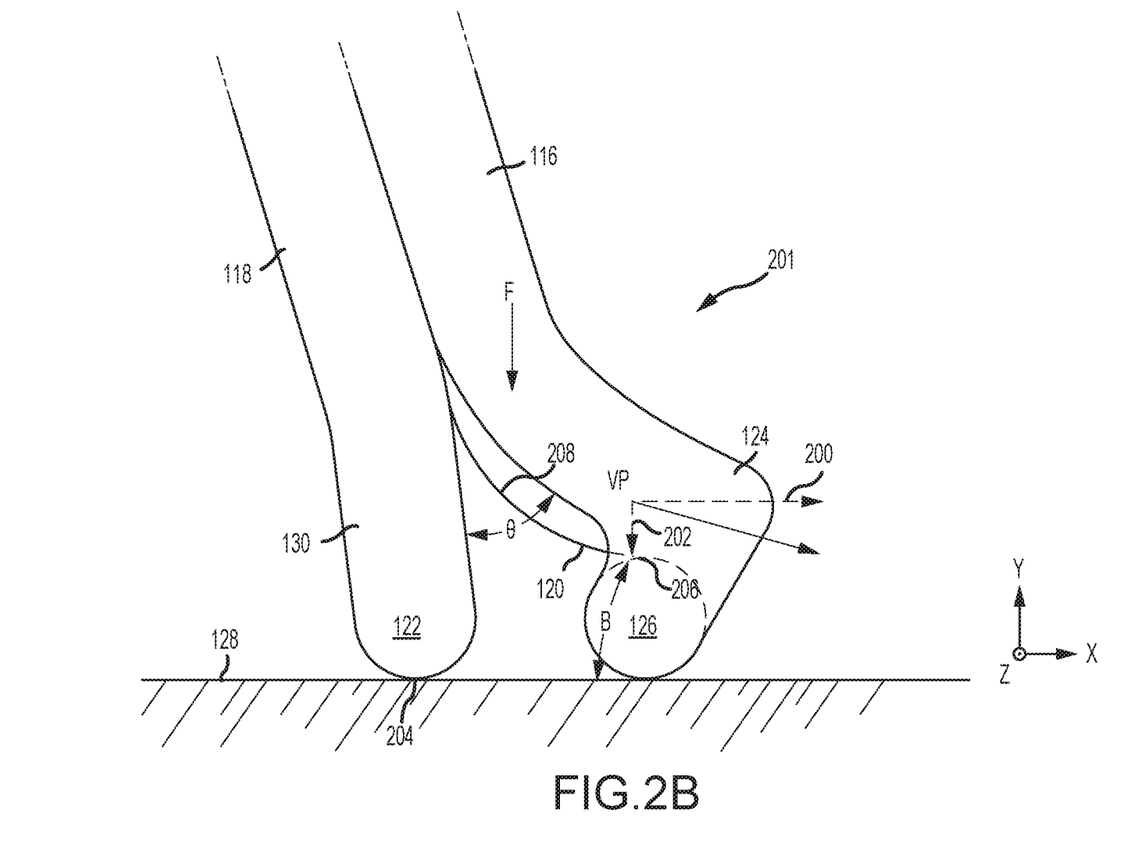
FIG. 2B illustrates a foot end of a sill height morphing evacuation slide, in accordance with various embodiments.

In various embodiments and as illustrated in FIG. 2B, sliding surface 120 is coupled to a top surface 206 of first foot tube 126 and a portion 208 of sliding surface 120 hangs free of portion 130 of lower chamber 118. In response to downward force F, foot section 124 has deformed as illustrated and, in response to the deformation of foot section 124, sliding surface 120 has turned to define angle β between exit surface 128 and sliding surface 120 and portion 130 has been deflected relatively downward to bring second foot tube 122 into contact with exit surface 128 to define angle θ between portion 130 and foot section 124. In various embodiments, in response to foot tube 122 contacting exit surface 128, in interference 204 is generated tending to inhibit further morphing of foot end 108. In response to the deformation of foot section 124 turning sliding surface 120 to define angle β, $V_P$ is turned about the Z-axis such that the magnitude of Y-component 202 is less than the magnitude of X-component 200. In this regard, a morphing feature tends to reduce the likelihood of passenger injury in impacting exit surface 128 by deforming sliding surface 120 thereby turning velocity vector $V_P$ relatively away from exit surface 128.

In various embodiments an evacuation slide such as evacuation slide 104 may comprise a thermoplastic synthetic rip-stop polymer such as, for example, nylon, ballistic nylon, polypropylene, polyester, or any other suitable material, and may be selected or treated to be substantially impermeable to gas. In various embodiments, an upper chamber and a lower chamber of a side tubes such as side tubes 117 may be coupled by an adhesive bond such as, for example, a two part adhesive, or may be chemically welded, or may be bonded by seam tape, or be bonded by mechanical welding such as, for example, thermal or ultrasonic welding. In various embodiments, a strap such as straps 134 may comprise a rope, tape, ribbon, webbing (e.g., nylon webbing), or any other suitable strap. In various embodiments, a strap such as straps 134 may comprise a corded or woven strap. In various embodiments, a strap such as straps 134 may comprise an elastomer. In various embodiments, a strap such as straps 134 may comprise nylon, ballistic nylon, polypropylene, polyester, cotton, or any other suitable material.

Figure 3:
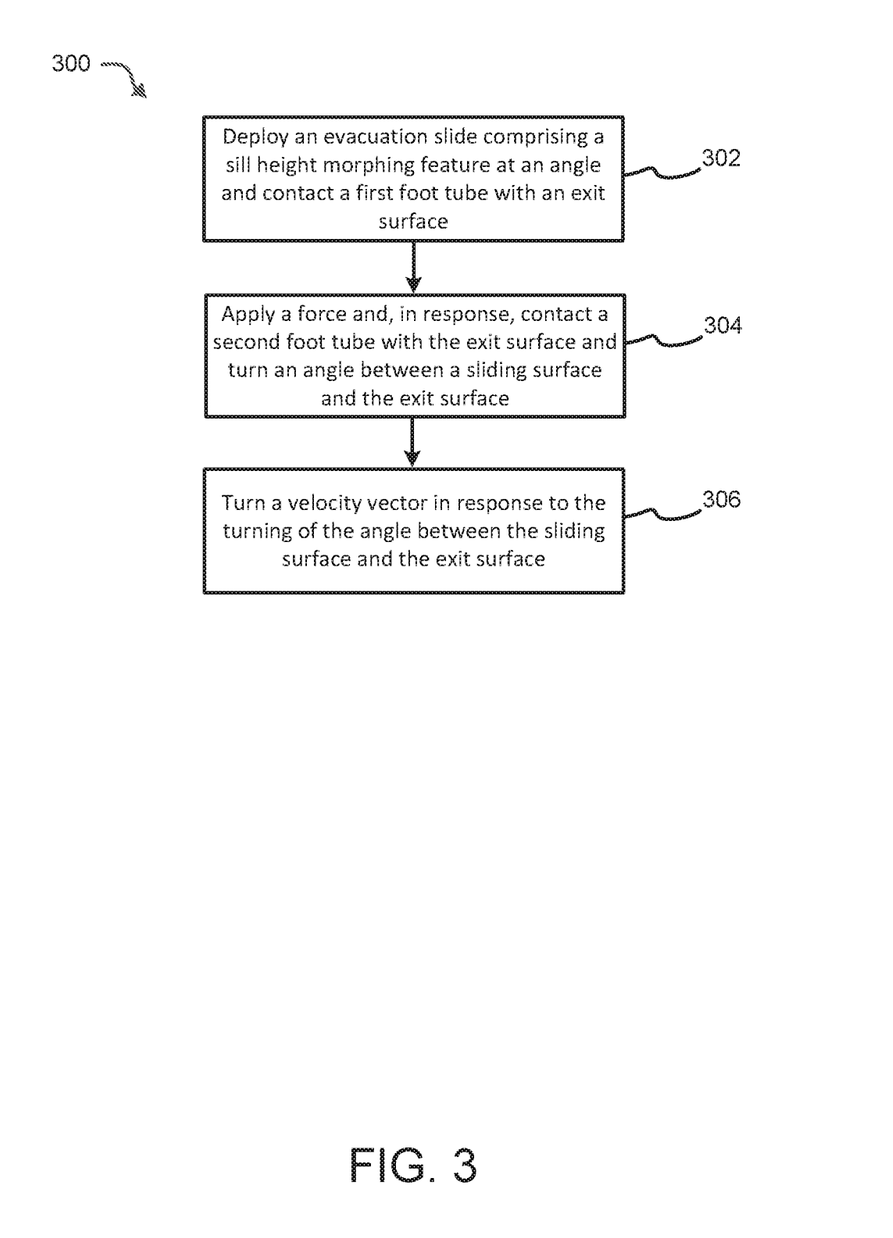
FIG. 3 illustrates a method of morphing a sill height morphing evacuation slide, in accordance with various embodiments.

With reference to FIG. 3, a method 300 of morphing a sill height morphing evacuation slide is provided, in accordance with various embodiments. Method 300 comprises deploying, from a door sill, an evacuation slide comprising a foot end having sill height morphing feature comprising a foot section and a portion of a lower chamber, and contacting a first foot tube of the foot section with an exit surface, wherein the portion of the lower chamber comprises a second foot tube, wherein an angle between the evacuation slide and the exit surface is such that the portion of the lower chamber comprising the second foot tube may swing free of an upper chamber in response to a force (step 302). The method may further comprise applying a force to the foot section and, in response to applying the force, contacting the second foot tube with the exit surface and turning an angle between a sliding surface and the exit surface from a first angle to a second angle (step 304). The method may further comprise turning a velocity vector in response to turning the angle between the sliding surface and the exit surface from the first angle to the second angle (step 306).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sill height morphing feature comprising:
   an upper chamber comprising a foot section and a first foot tube, wherein the foot section is orthogonal, relative to a long axis of the upper chamber, and wherein the first foot tube is coupled at the foot section transverse to the upper chamber;
   a lower chamber, relatively below the upper chamber and extending parallel thereto, coupled to the upper chamber and comprising a second foot tube, wherein the second foot tube extends transverse to the lower chamber and parallel to the first foot tube; and
   a sliding surface between the upper chamber and the lower chamber, wherein the first foot tube lies relatively beneath the sliding surface, wherein the second foot tube lies relatively beneath the sliding surface and relatively behind and proximate to the first foot tube, wherein the sliding surface is coupled to the first foot tube at a top surface of the first foot tube,
   wherein a portion of the lower chamber comprising the second foot tube is configured to swing free from the upper chamber and the sliding surface and, in response, selectively deform a portion of the sliding surface.

2. The sill height morphing feature of claim 1, wherein the foot section, the sliding surface, and the portion of the lower chamber comprising the second foot tube are configured to deform in response to a force and a change in a sill height.

3. The sill height morphing feature of claim 2, wherein the portion of the lower chamber comprising the second foot tube and the foot section define an angle $\theta$ respectively between each other in response to the force.

4. The sill height morphing feature of claim 3, wherein the second foot tube contacts an exit surface in response to the force.

5. The sill height morphing feature of claim 4, wherein an interference between the exit surface and the second foot tube tends to inhibit deformation of the foot section, the sliding surface, and the portion of the lower chamber comprising the second foot tube.

6. The sill height morphing feature of claim 5, wherein the sliding surface defines an angle $\alpha$ between the exit surface and the sliding surface and wherein, in response to the deformation of the foot section the sliding surface turns to define an angle $\beta$ between the exit surface and the sliding surface.

7. An evacuation system for an aircraft structure comprising:
   an evacuation slide coupled to the aircraft structure, the evacuation slide comprising:
   a head end coupled at a door sill of the aircraft structure;
   a foot end opposite the head end;
   a dual chambered side tube extending longitudinally from the head end to the foot end and having an upper chamber and a lower chamber, wherein the lower chamber is coupled to the upper chamber longitudinally and relatively below the upper chamber;
   a sliding surface between the upper chamber and the lower chamber and extending from the head end to the foot end;
   the foot end having a sill height morphing feature comprising:
   a foot section having a first foot tube coupled to the upper chamber, wherein the foot section comprises an axis of orthogonality, relative to an axis of the upper chamber, intersecting the first foot tube;
   a portion of the lower chamber comprising a second foot tube configured to swing free from the upper chamber and the sliding surface and, in response, selectively deform a portion of the sliding surface;
   wherein the first foot tube lies relatively beneath the sliding surface, wherein the second foot tube lies relatively beneath the sliding surface and relatively behind and proximate to the first foot tube, wherein the sliding surface is coupled to the first foot tube at a top surface of the first foot tube.

8. The evacuation system for the aircraft of claim 7, wherein the foot section, the sliding surface, and the portion of the lower chamber comprising the second foot tube are configured to deform in response to a force.

9. The evacuation system for the aircraft of claim 8, wherein the portion of the lower chamber comprising the second foot tube and the foot section define an angle $\theta$ respectively between each other in response to the force.

10. The evacuation system for the aircraft of claim 9, wherein the second foot tube contacts an exit surface in response to the force.

11. The evacuation system for the aircraft of claim 10, wherein an interference between the exit surface and the second foot tube tends to inhibit deformation of the foot section, the sliding surface, and the portion of the lower chamber comprising the second foot tube.

12. The evacuation system for the aircraft of claim 11, wherein the sliding surface defines an angle $\alpha$ between the exit surface and the sliding surface and wherein, in response to the deformation of the foot section the sliding surface turns to define an angle β between the exit surface and the sliding surface.

13. A method of morphing a sill height morphing evacuation slide, the method comprising:
    deploying, from a door sill, an evacuation slide comprising a foot end having sill height morphing feature comprising a foot section and a portion of a lower chamber; and
    contacting a first foot tube of the foot section with an exit surface, wherein the portion of the lower chamber comprises a second foot tube, wherein an angle between the evacuation slide and the exit surface is such that the portion of the lower chamber comprising the second foot tube swings free of an upper chamber in response to a force.

14. The method of claim 13, further comprising applying a force to the foot section and, in response to the applying the force, contacting the second foot tube with the exit surface and turning an angle between a sliding surface and the exit surface from a first angle to a second angle.

15. The method of claim 14, further comprising turning a velocity vector of an object traveling along the sliding surface in response to turning the angle between the sliding surface and the exit surface from the first angle to the second angle.

* * * * *